United States Patent
Dey et al.

(10) Patent No.: US 7,417,945 B2
(45) Date of Patent: Aug. 26, 2008

(54) TRANSMITTER AND RECEIVER FOR USE WITH AN ORTHOGONAL FREQUENCY DIVISION MULTIPLEXING SYSTEM

(75) Inventors: Sourav R. Dey, Cambridge, MA (US); David P. Magee, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 928 days.

(21) Appl. No.: 10/677,566

(22) Filed: Oct. 2, 2003

(65) Prior Publication Data

US 2005/0073946 A1   Apr. 7, 2005

(51) Int. Cl.
*H04J 11/00* (2006.01)

(52) U.S. Cl. .................. 370/208; 370/503; 375/354

(58) Field of Classification Search ........... 370/208, 370/203
See application file for complete search history.

(56) References Cited

U.S. PATENT DOCUMENTS

| | | | |
|---|---|---|---|
| 6,389,087 B1 * | 5/2002 | Heinonen et al. | 375/354 |
| 6,654,429 B1 * | 11/2003 | Li | 375/316 |
| 2002/0034267 A1 * | 3/2002 | Chuang et al. | 375/340 |
| 2003/0128751 A1 * | 7/2003 | Vandenameele-Lepla | 375/229 |
| 2004/0022174 A1 * | 2/2004 | Li et al. | 370/203 |
| 2004/0141457 A1 * | 7/2004 | Seo et al. | 370/203 |
| 2006/0034380 A1 * | 2/2006 | Li | 375/260 |

OTHER PUBLICATIONS van de Beek et al; On Channel Estimation in OFDM Systems; 1995 IEEE; pp. 815-819.
Yang et al; Analysis of Low-Complexity Windowed DFT-Based MMSE Channel Estimator for OFDM Systems; 2001 IEEE, vol. 49, No. 11, Nov. 2001; pp. 1977-1987.

* cited by examiner

*Primary Examiner*—Chau Nguyen
*Assistant Examiner*—Suk Jin Kang
(74) *Attorney, Agent, or Firm*—Steven A. Shaw; W. James Brady; Frederick J. Telecky, Jr.

(57) ABSTRACT

The present invention discloses a transmitter and receiver for use with an orthogonal frequency division multiplexing (OFDM) communications system. In one embodiment, the OFDM communications system includes an OFDM transmitter that generates a training sequence that includes a fractional tone in a guard band thereof and transmits the training sequence via a channel. The OFDM communications system further includes an OFDM receiver that receives the training sequence and employs the fractional tone to obtain a channel response estimate.

21 Claims, 6 Drawing Sheets

TRANSMITTER AND RECEIVER FOR USE WITH AN ORTHOGONAL FREQUENCY DIVISION MULTIPLEXING SYSTEM

TECHNICAL FIELD OF THE INVENTION

The present invention is directed, in general, to wireless communications systems and, more specifically, to a transmitter and a receiver for use with an orthogonal frequency division multiplexing (OFDM) communications system and a method of obtaining a channel response estimate associated therewith.

BACKGROUND OF THE INVENTION

The use of wireless communications continues to expand with the development of wireless devices and the improvement of wireless communications systems. More users are exchanging information through pagers, cellular telephones and other wireless communications products. Additionally, wireless communications allows users to exchange information in personal and business computing through wireless networks such as a wireless local area network (WLAN). A WLAN provides flexibility and mobility for users by enabling access to computer networks without being tied to a wired network.

Several standards have been established to provide uniformity and consequently growth in the development of wireless networks. One such standard is 802.11, promulgated by the Institute of Electrical and Electronic Engineers (IEEE), which is incorporated herein by reference. IEEE 802.11 is an umbrella standard that encompasses a family of specifications pertaining to WLAN technology. Generally, IEEE 802.11 specifies an over-the-air interface between a wireless client and a base station or between two wireless clients.

Within the IEEE 802.11 family are several specifications covering topics such as different transmission rates, encoding schemes and frequency bands for transmitting data wirelessly. For example, IEEE 802.11(a) is an extension of IEEE 802.11 that specifically addresses WLANs having a data rate up to 54 Mbps at a frequency band of 2.4 GHz. Additionally, IEEE 802.11(a) specifies an orthogonal frequency division multiplexing (OFDM) encoding scheme.

The OFDM system, specified in IEEE 802.11(a), provides a WLAN with data payload communications capabilities of 6, 9, 12, 18, 24, 36, 48 and 54 Mbps. The IEEE 802.11(a) OFDM system uses 52 subcarriers, or subchannels, that are modulated using binary or quadrature phase shift keying (BPSK/QPSK), 16-quadrature amplitude modulation (QAM), or 64-QAM, depending on the data rate. Forward error correction coding (convolutional coding) is used with a coding rate of ½, ⅔, or ¾.

A long training sequence exists in an IEEE 802.11(a) compliant system and can be used for channel estimation. In the frequency-domain, the long training sequence is given as equation 1:

$$X[K]=\{0,0,0,0,0,0,1,1,-1,-1,1,1,-1,1,-1,1,1,1,1,\\
1,-1,-1,1,1,-1,1,-1,1,1,1,1,0,1,-1,-1,1,1,-1,1,-\\
1,1,-1,-1,-1,-1,-1,1,1,-1,-1,1,-1,1,-1,1,1,1,1,\\
0,0,0,0,0\}$$ (1)

for $-32 \leq k \leq 31$.

The long training sequence has a zero at the DC zero tone (emphasized in equation 1 as the middle tap k=0) and a guard band of zeros on either side of the 52 excited tones k=[−26,−1] and k=[1,26] (also emphasized in equation 1). Generally, an excited tone will include information and a zero tone, or unexcited tone, does not intentionally include any information. Before the long training sequence is transmitted through a wireless multipath channel, an inverse Fast Fourier Transform (IFFT) of equation 1 is performed thereon and cyclically extended to 80 samples.

A channel estimator receives a distorted version of the long training sequence in a receiver that performs functions such as timing acquisition, frequency offset, and a Fast Fourier Transform (FFT) of the received long training sequence which has been distorted. Mathematically, the distorted version of the long training sequence in the frequency-domain, Y[k], is:

$$Y[k]=X[k]H[k]+N[k]$$ (2)

where H[k] is a wireless channel response and N[k] is noise. The long training sequence X[k], given by equation 1, is known at the receiver, thus the channel estimator uses the known long training sequence X[k] and the distorted version thereof Y[k] to generate a channel response estimate $\hat{H}[k]$ for a receiver. In the time-domain, the wireless multi-path channel is modeled as a time-limited channel impulse response represented by equation 3:

$$h(t) = \sum_{i=0}^{L-1} a_i \delta(t - \tau_i T_s)$$ (3)

where L is the number of multi-path delays, $a_i$ is a Rayleigh or Ricean distributed complex tap gain, $\tau_i$ represents a delay of the $i^{th}$ path, and $T_s$ is a sampling period. Furthermore, $0<\tau_i T_s<T_g$, i.e., the entire channel impulse response lies within the guard band. Typically, the delay $\tau_i$ is not an integer such that the channel impulse response does not fall at discrete time samples.

When sampled and converted to discrete time, a discrete-time channel can be interpreted as non-integer discrete time delays. Using continuous time processing of the discrete time signals as an interpretation, h[n] can be viewed as a sampled version of the band-limited interpolation of the time-limited channel impulse response h(t), i.e., sinc convolved over every channel impulse response. Mathematically, the discrete-time channel impulse response simplifies to equation 4.

$$h[n] = \sum_{i=0}^{L-1} a_i \frac{\sin\pi(n - \tau_i/T_s)}{\pi(n - \tau_i/T_s)}$$ (4)

To perform these calculations, the channel estimator is usually implemented in a processor-based system. As with any processor, a tradeoff exists between performance and the million instructions per second (MIPS) available. Though desired, a high-performance channel estimator typically involves complex calculations as described herein which results in an increase in algorithm complexity. Therefore, a design of a receiver may often require a balance between quality and complexity.

In related U.S. patent application entitled "CHANNEL ESTIMATOR FOR A RECEIVER AND METHOD OF OPERATION THEREOF," Ser. No. 10/677,605, which is commonly assigned and filed concurrently with the present application, and is incorporated herein by reference as if reproduced herein in its entirety, a less computational complex OFDM receiver is disclosed. The improved OFDM receiver provides an improved channel response estimate by substantially zeroing middle taps associated with a channel impulse response to reduce a contribution of noise. In addition to an improved OFDM receiver, however, an improved OFDM transmitter or OFDM communications system may also contribute to provide a less computational complex OFDM receiver.

Accordingly, what is needed in the art is a way to further enhance the recovery of channel information using a training sequence and obtain a channel response estimate of a channel in an OFDM communications system.

SUMMARY OF THE INVENTION

To address the above-discussed deficiencies of the prior art, the present invention provides in one aspect, an orthogonal frequency division multiplexing (OFDM) transmitter. In one embodiment, the OFDM transmitter includes a training sequence generator configured to generate a training sequence that includes a fractional tone in a guard band thereof. The OFDM transmitter further includes OFDM transmission circuitry, coupled to the training sequence generator, configured to transmit the training sequence via a channel.

In another aspect, the present invention provides an OFDM receiver. In one embodiment, the OFDM receiver includes OFDM reception circuitry configured to receive via a channel a training sequence that includes a fractional tone in a guard band thereof. The OFDM receiver further includes a channel estimator, coupled to the OFDM reception circuitry, configured to employ the fractional tone to obtain a channel response estimate.

The present invention, therefore, presents an OFDM transmitter that modifies a training sequence, such as a long training sequence associated with an IEEE 802.11(a) communications system, that is advantageously employed by an OFDM receiver to provide a channel response estimate while reducing computing requirements and correspondingly memory requirements within the OFDM receiver. Even having a lower computational complexity, a channel estimator of the OFDM receiver may provide a channel response estimate equal to or better than conventional channel estimators. The channel estimator may employ the modified long training sequence to provide additional channel information for an improved channel response estimate that results in improved data recovery by the OFDM receiver.

In yet another aspect, the present invention provides a method of obtaining a channel response estimate for use with an OFDM communications system. In one embodiment, the method includes generating a fractional tone in a guard band of a training sequence, transmitting the training sequence via a channel and employing the fractional tone to obtain a channel response estimate.

The present invention also provides, in yet another aspect, an OFDM communications system. In one embodiment, the OFDM communications system includes an OFDM transmitter that generates a training sequence that includes a fractional tone in a guard band thereof and transmits the training sequence via a channel. The OFDM communications system further includes an OFDM receiver that receives the training sequence and employs the fractional tone to obtain a channel response estimate.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
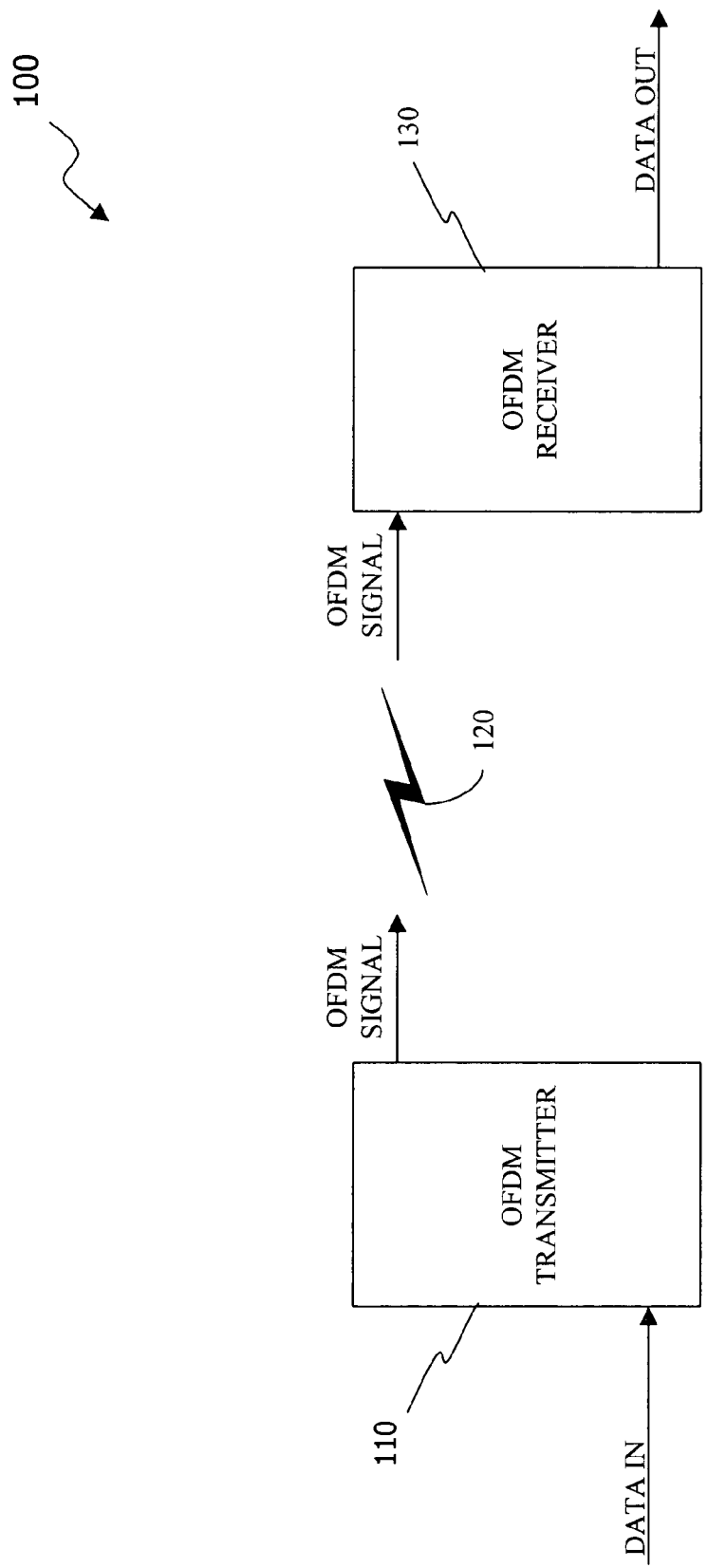
FIG. 1 illustrates a block diagram of an embodiment of an OFDM communications system constructed according to the principles of the present invention.

Referring initially to FIG. 1, illustrated is a block diagram of an embodiment of an OFDM communications system, generally designated 100, constructed according to the principles of the present invention. The OFDM communications system 100 includes an OFDM transmitter 110 and an OFDM receiver 130 that communicate via a wireless channel 120.

The OFDM communications system 100 may be a wireless local area network (WLAN). For example, the OFDM transmitter 110 may be an access point and the OFDM receiver 130 may be laptop computer, a point-of-sale terminal or a personal digital assistant (PDA). In other embodiments, the OFDM communications system 100 may be embodied within an OFDM transceiver that includes the OFDM transmitter 110 and the OFDM receiver 130. The OFDM communications system 100 may operate as a 1×1 system having one transmitting and one receiving antenna. Additionally, the OFDM communications system 100 may operate as a multiple antenna system such as a 2×2 system.

The OFDM communications system 100 may operate according to Institute of Electrical and Electronic Engineers (IEEE) standard 802.11(a). As such, the OFDM communications system 100 may transmit data with a preamble and header that are employed by the OFDM receiver 130 to assist in the demodulation and recovery of the data. The preamble may include two repetitions of a long training sequence which the OFDM receiver 130 may employ for channel estimation and fine frequency acquisition. Additionally, the data and associated preamble may include a guard band.

The OFDM transmitter 110 may be configured to generate a training sequence that includes a fractional tone in the guard band. The fractional tone may be positive or negative in sign. In one embodiment, the generated fractional tone may be located in a center of the guard band. In a preferred embodiment, the training sequence may be generated as a modified long training sequence according to the IEEE 802.11(a) with an additional fractional tone in the guard band. The guard band of the long training sequence, as indicated by the boldface of equation 1, typically includes zero tones in six subcarriers before and five subcarriers after a data band. In some embodiments, the fractional tone may be attenuated at about twelve decibels from tones in the data band of the long training sequence. In other embodiments, the fractional tone may be attenuated about six decibels from tones in the data band of the long training sequence. Of course, one skilled in the art will understand that the fractional tones may be at other decibel levels.

The guard band may be free of excited tones other than the fractional tone. In alternative embodiments, a fractional tone may be generated in a plurality of subcarriers of the guard band. Each of the fractional tones may be at about the same decibel level or each of the fractional tones may have a different decibel level. For example, the fractional tones may decrease in decibel level from subcarriers adjacent to the data band to the subcarriers located at the beginning and end of the guard band. In this way, the fractional tones may taper-off from the data band to possibly prevent interference with other transmissions.

The OFDM transmitter 110, therefore, may generate the fractional tone in bins, or subcarriers, of the long training sequence that are typically not energized, or excited, according to IEEE 802.11(a). Since the tones in the guard band of the long training sequence are typically not energized, then little or no channel information may be obtained for the guard band subcarriers. The OFDM transmitter 110, therefore, energizes at least one subcarrier in the guard band of the long training sequence to provide additional information for obtaining a channel response estimate at the corresponding OFDM receiver 130.

Additionally, the OFDM transmitter 110 may transmit the data and the long training sequence as an OFDM signal via the wireless channel 120. The OFDM transmitter 110 may transmit the data and the long training sequence according to IEEE 802.11(a). The OFDM transmitter 110 may transmit the OFDM signal at 2.4 GHz or at 5 GHz. Of course, one skilled in the art will understand that the OFDM transmitter 110 may operate at other frequencies. Additionally, one skilled in the art will understand the general operation and configuration of an OFDM transmitter and an OFDM receiver.

The OFDM receiver 130 may be configured to receive via the wireless channel 120 the OFDM signal and employ the fractional tone and the training sequence to obtain a channel response estimate of the wireless channel 120. In one embodiment, the OFDM receiver 130 may interpolate guard band tones for each subcarrier of the guard band based on a single fractional tone received in the guard band. In a preferred embodiment, the OFDM receiver 130 linearly interpolates the guard band tones based on at least one fractional tone. In some embodiments, the OFDM receiver 130 may perform the interpolation based on the fractional tone located in the center of the guard band. The OFDM receiver 130 may also interpolate tones of unenergized guard band subcarriers employing multiple fractional tones associated with the long training sequence.

Additionally, the OFDM receiver 130 may interpolate the DC tone or zero tone based on tones in adjacent subcarriers. The interpolation of the DC tone may allow a greater contribution to the channel response estimate thereby improving reception of the data. Thus, the OFDM receiver 130 may provide a less computational complex receiver that performs equally or better than more complex and expensive receivers.

Figure 2:
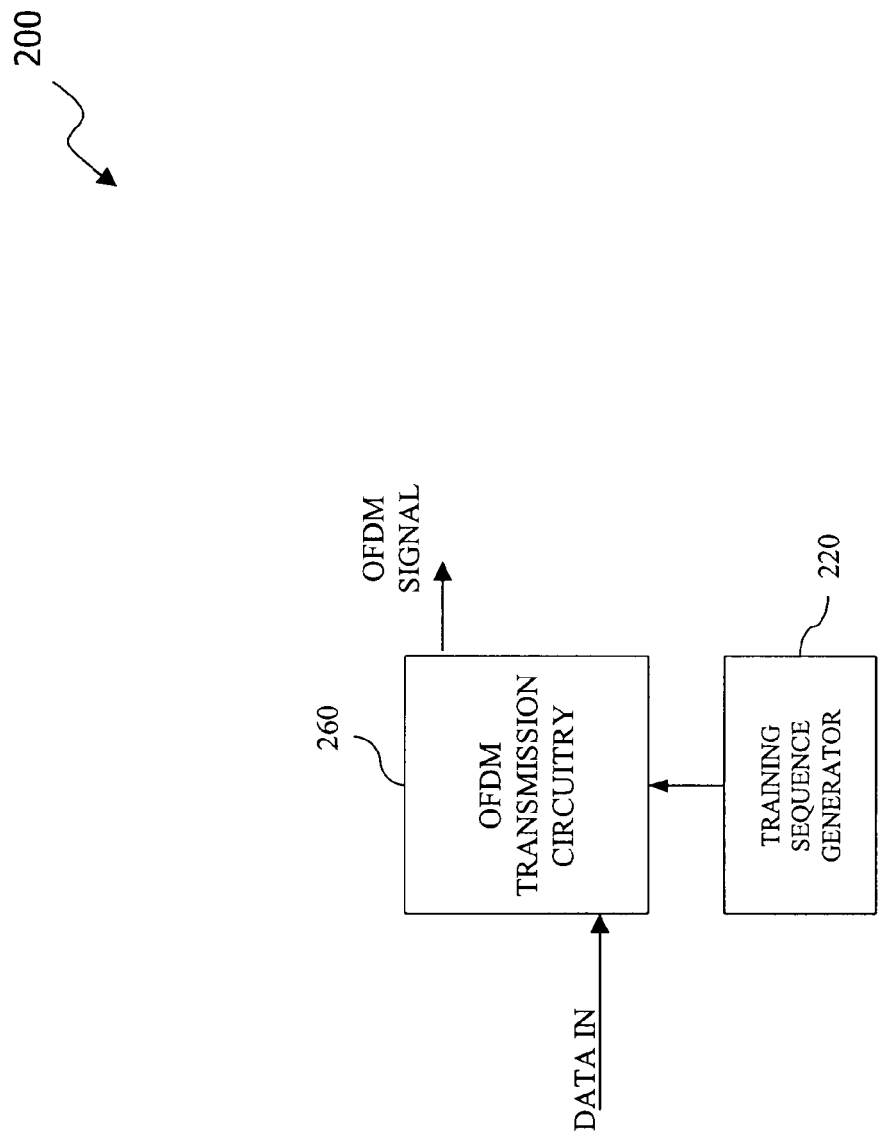
FIG. 2 illustrates a block diagram of an embodiment of an OFDM transmitter constructed according to the principles of the present invention.

Turning now to FIG. 2, illustrated is a block diagram of an embodiment of an OFDM transmitter, generally designated 200, constructed according to the principles of the present invention. The OFDM transmitter 200 includes a training sequence generator 220 and OFDM transmission circuitry 260. The training sequence generator 220 and the OFDM transmission circuitry 260 may be embodied, without limitations, within an Application Specific Integrated Circuit (ASIC), or in a programmable device such as a Field Programmable Gate Array (FPGA) or a Digital Signal Processor (DSP). One skilled in the art will understand that the OFDM transmitter 200 may include additional components that are not shown, but may be employed within conventional OFDM transmitters.

The training sequence generator 220 may be configured to generate a training sequence that includes a fractional tone in a guard band. In a conventional OFDM transmitter, tones of the guard band of a long training sequence according to IEEE 802.11(a) are not energized. At an OFDM receiver, therefore, there may be no channel information gathered in the guard band. The training sequence generator 220 of the OFDM transmitter 200, therefore, advantageously generates and transmits at least one fractional tone in the guard band of the long training sequence to provide channel information for the OFDM receiver.

In a preferred embodiment, the fractional tone is generated by modifying an algorithm typically employed to generate the long training sequence such that at least a subcarrier of the guard band is energized. In one embodiment, the guard band may be excited with a pattern six decibels down from that of a data band of the long training sequence to minimize spectral leakage and other edge effects. The excitation may also be placed twelve decibels down from the data band and still provide adequate performance. Of course, other decibel levels may also be employed.

For example, the training sequence generator 220 may be configured to generate a training sequence of tones such as the modified long training sequence given by equation 5 in the frequency-domain:

$$X[k]=\{0.5,0,0,0,0,0,0,1,1,-1,-1,1,1,-1,1,-1,1,1,1,1,1,\\1,-1,-1,1,1,-1,1,-1,1,1,1,1,1,0,1,-1,-1,1,1,-1,1,\\-1,1,-1,-1,-1,-1,-1,-1,1,1,-1,-1,1,-1,1,-1,1,1,1,\\1,1,0,0,0,0,0\}$$  (5)

for $-32 \leq k \leq 31$.

In other embodiments, the training sequence generator 220 may be configured to modify the long training sequence with a fractional tone in each subcarrier of the guard band as represented by equation 6 in the frequency-domain:

$$X[k]=\{0.5,0.5,0.5,0.5,0.5,0.5,1,1,-1,-1,1,1,-1,1,-1,1,1,\\1,1,1,1,-1,-1,1,1,-1,1,1,-1,1,1,1,1,1,0,1,-1,-1,1,1,\\1,-1,1,-1,1,-1,-1,-1,-1,-1,1,1,-1,-1,1,1,-1,1,-1,\\1,1,1,1,0.5,0.5,0.5,0.5,0.5\}$$  (6)

for $-32 \leq k \leq 31$.

In other embodiments, a decibel level of the fractional tones in the guard band may decrease from the guard band subcarrier adjacent the data band to the outer guard band subcarriers. This tapering-effect of the fractional tones may be configured to substantially match a spectral shape of a filter (e.g., a band pass filter) of the OFDM receiver and prevent interference with other data bands.

The OFDM transmission circuitry 260, coupled to the training sequence generator 220, may be configured to transmit the long training sequence including the fractional tone via a channel. The OFDM transmission circuitry 260 may include conventional components commonly located within an OFDM transmitter. For example, the OFDM transmission circuitry 260 may include an encoder that employs Forward Error Correction (FEC) coding of the data. Additionally, the OFDM transmission circuitry 260 may include a data processor that prepares the coded data for wireless transmission. The data processor may interleave, map and convert the data to a time-domain employing an inverse Fast Fourier Transform (IFFT) algorithm. Additionally, the data processor may add a guard interface, shape and modulate the data for transmission employing binary or quadrature phase shift keying (BPSK/QPSK), 16-quadrature amplitude modulation (QAM), or 64-QAM, depending on the data rate required. One skilled in the art will understand the configuration and operation of the OFDM transmission circuitry 260.

Figure 3:
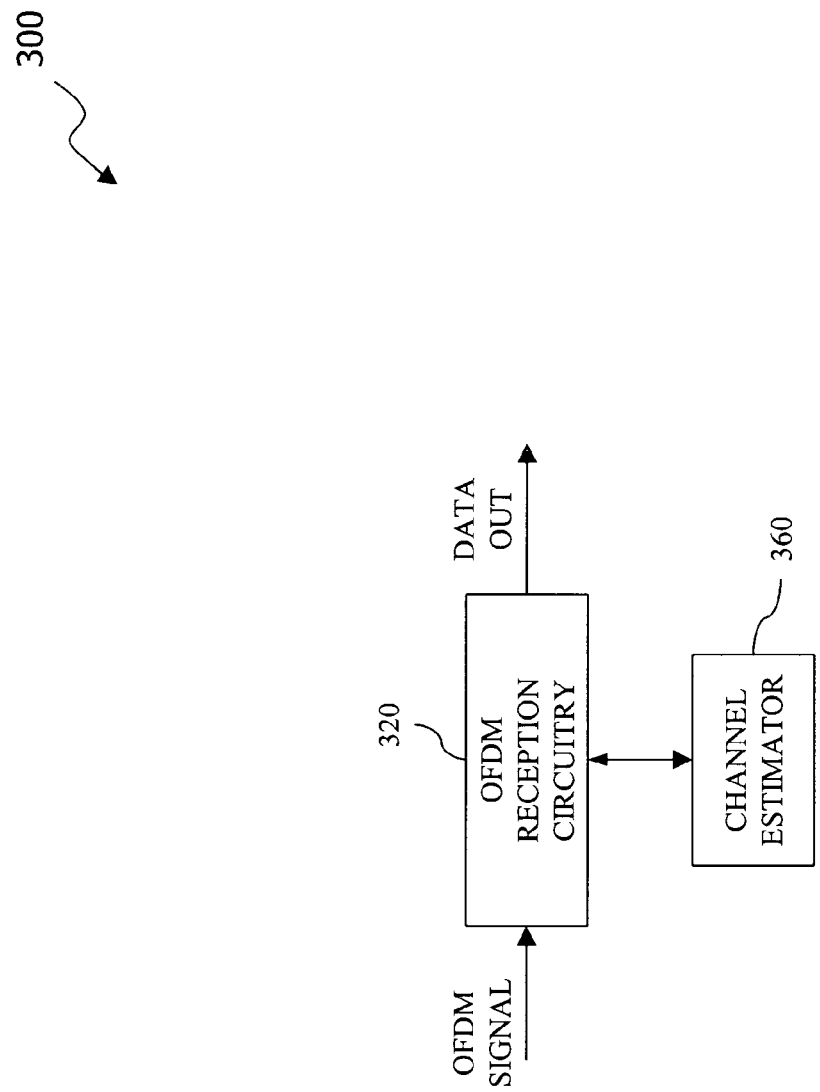
FIG. 3 illustrates a block diagram of an embodiment of an OFDM receiver constructed according to the principles of the present invention.

Turning now to FIG. 3, illustrated is a block diagram of one embodiment of an OFDM receiver, generally designated 300, constructed according to the principles of the present invention. The OFDM receiver 300 includes OFDM reception circuitry 320 and a channel estimator 360. The OFDM reception circuitry 320 and the channel estimator 360 may be embodied, without limitations, within an Application Specific Integrated Circuit (ASIC), or in a programmable device such as a Field Programmable Gate Array (FPGA) or a Digital Signal Processor (DSP). One skilled in the art will understand that the OFDM receiver 300 may include additional components that are not shown, but may be employed within conventional OFDM receivers.

The OFDM reception circuitry 320 may be configured to receive an OFDM signal via a wireless channel including a training sequence that includes a fractional tone in a guard band. The OFDM reception circuitry 320 may include a radio frequency (RF) front end, an analog-to-digital (A/D) converter and a data processor. Additionally, the OFDM reception circuitry 320 may include a data decoder that employs the results of the channel estimator 360 to recover data sent by an OFDM transmitter.

The channel estimator 360, coupled to the OFDM reception circuitry 320, may be configured to employ the fractional tone to obtain a channel response estimate of the channel. In some embodiments, each subcarrier of the guard band may be energized with a fractional tone that the channel estimator 360 employs to obtain the channel response estimate. In one embodiment, each subcarrier of the guard band may be energized at a different decibel level. The fractional tone may be attenuated at about twelve decibels from tones in a data band of the long training sequence. The fractional tone may also be attenuated at about six decibels from tones in the data band of the long training sequence or, in other embodiments, attenuated at other decibel levels.

In a preferred embodiment, the channel estimator 360 may employ a modified long training sequence as given by equation 6 and discussed above with respect to FIG. 2 to obtain the channel response estimate. Thus, the channel estimator 360 may use less computational complexity to provide a channel response estimate that traditionally requires high computational complexity. The channel estimator 360 may also employ a 64-point FFT sequence which is a distorted version of the modified long training sequence due to noise and channel degradation.

The channel estimator 360 may include a conventional multiplier, an inverse Fast Fourier Transform (IFFT) algorithm and a Fast Fourier Transform (FFT) algorithm to provide the channel response estimate. In one embodiment, the channel estimator 360, may receive the distorted version of the modified long training sequence from a timing acquisition block of the OFDM reception circuitry 320. The channel estimator 360 may provide a least squares solution by combining the distorted version of the modified long training sequence with the known modified long training sequence resulting in a least squares channel response estimate, $\hat{H}_{LS_m}[k]$, represented by equation 7:

$$\hat{H}_{LS_m}[k] = \frac{Y_m[k]}{X_m[k]} \quad \text{for } k \in \{-26, -1\} \text{ and } \{1, 26\} \tag{7}$$

where $Y_m[k]$ is a distorted version of the long training sequence and $X_m[k]$ is the known long training sequence. A least squares estimate, therefore, may include 63 energized tones since each subcarrier of the guard band is energized with a fractional tone. The DC tone, however, may still be zero.

In some embodiments, the channel estimator 360 may be configured to interpolate a DC tone based on adjacent tones of the modified long training sequence. The DC tone, or zero tone, may be linearly interpolated from the least squares estimate at the negative first tone and the positive first tone $\hat{H}_{LS}[-1]$, $\hat{H}_{LS}[1]$. Mathematically, a value for the DC tone may be obtained through an averaging operation given by equation 8.

$$\hat{H}_{LS}[0] = \frac{\hat{H}_{LS}[-1] + \hat{H}_{LS}[1]}{2} \tag{8}$$

The least squares estimate, therefore, may include a total of 64 tones. Of course, one skilled in the art may employ other methods or techniques to process the DC tones to obtain the least squares solution in the frequency-domain.

The channel estimator 360 may then employ the IFFT algorithm to convert the 64-point least squares estimate from the frequency-domain to the time-domain. In the time-domain, the 64-point sequence is an estimate of the channel impulse response. To possibly reduce the contribution of noise to the channel response estimate, middle taps associated with the channel impulse response may be set substantially to zero as described in the co-pending U.S. patent application entitled "CHANNEL ESTIMATOR FOR A RECEIVER AND METHOD OF OPERATION THEREOF," Ser. No. 10/677,605. Once designated taps associated with the channel impulse response have been substantially zeroed, the channel estimator 360 may transform the 64-point least squares estimate in the time-domain back to the frequency-domain employing the FFT algorithm resulting in the channel response estimate. The channel response estimate may then be employed to assist in recovering data.

In some embodiments, the guard band may be free of excited tones other than the fractional tone and the channel estimator 360 may linearly interpolate remaining tones of the guard band. Exciting the guard band may cause spectral leakage and possibly cause concerns with an IEEE 802.11(a) communications system. Accordingly, a single tone in the guard band may be energized. The energized tone may be located at the center, X[−32], of the guard band. Thus, when the 64 point least squares estimate is taken in the channel estimator, there may be five missing tones on either side of the least squares channel response estimate at the 32nd tone, $\hat{H}_{LS}[32]$. Additionally, more than one fractional tone may be employed to interpolate the unenergized subcarriers of the guard band. In some embodiments, the channel estimator 360 linearly interpolates to determine the unenergized guard band subcarriers.

Figure 4:
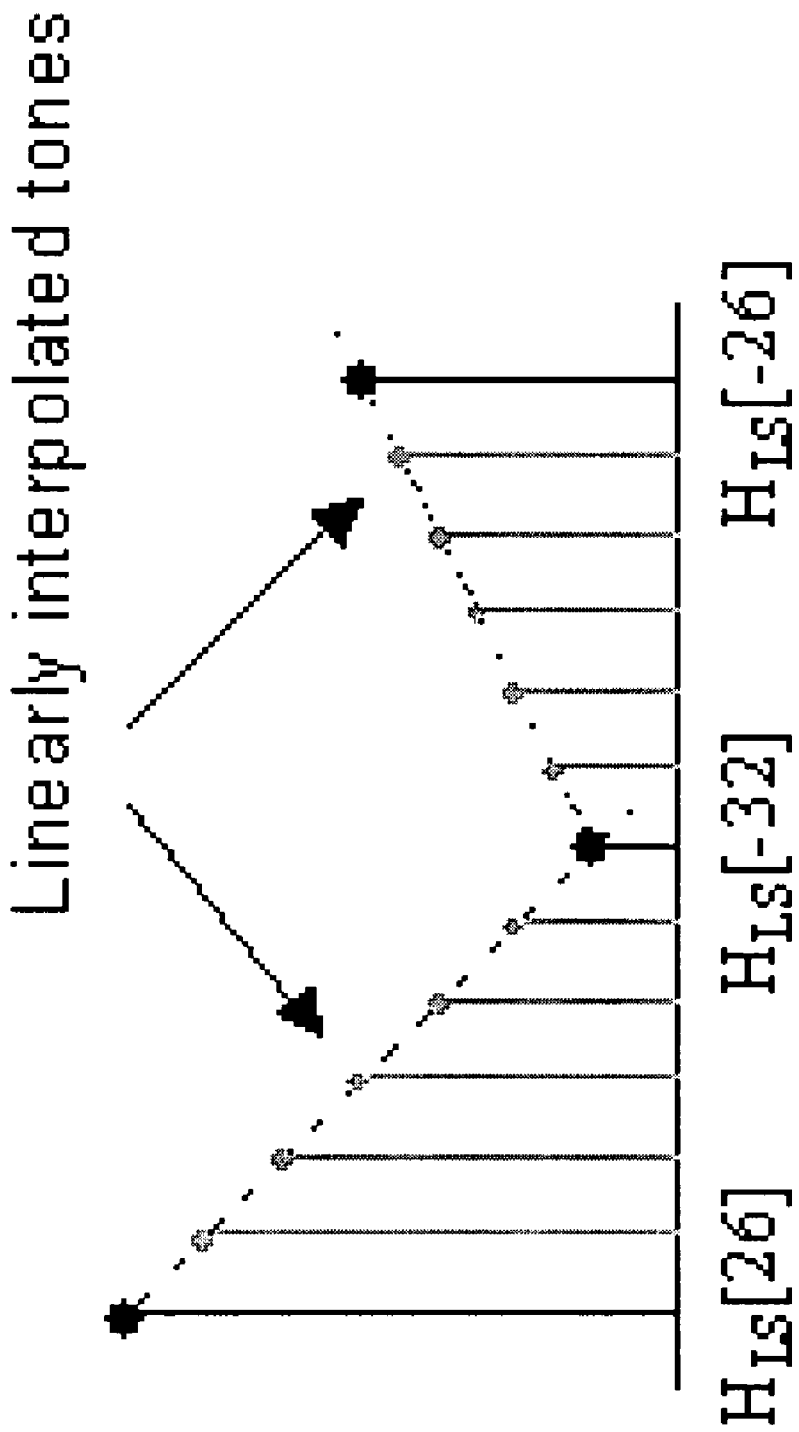
FIG. 4 is a diagram demonstrating a linear interpolation of guard band tones according to the principles of the present invention.

Turning now to FIG. 4, illustrated is a diagram demonstrating a linear interpolation of guard band tones in accordance with a receiver constructed according to the principles of the present invention. A center tone, X[−32], is located in the center of the guard band. Thus, a least squares estimate provided by the channel estimator 360 may have five missing tones on either side of the least squares channel response estimate at the negative 32nd tone $\hat{H}_{LS}[-32]$. The channel estimator 360 may obtain a least squares estimate at the center tone and linearly estimate the five missing guard band tones using the least squares channel response estimate at the negative 26th tone and the positive 26th tone $\hat{H}_{LS}[-26]$, $\hat{H}_{LS}[26]$, as references. Specifically, proximate tones [27, 31] may be approximated using linear interpolation between the least squares channel response estimate at the positive 26th tone $\hat{H}_{LS}[26]$ and the least squares channel response estimate at the negative 32nd tone $\hat{H}LS[-32]$ and proximate tones [−31, −27] may be approximated using linear interpolation between the least squares channel response estimate at the negative 26th tone $\hat{H}_{LS}[-26]$ and the least squares channel response estimate at the negative 32nd tone $\hat{H}_{LS}[-32]$. After the linear interpolation, the channel estimator 360 may have a least squares estimate at 64 tones of the modified long training sequence. The channel estimator 360 may then employ the IFFT algorithm to convert the least squares sequence into the time-domain for further processing before converting back to the frequency-domain employing an FFT algorithm thereby providing the channel response estimate.

Figure 5:
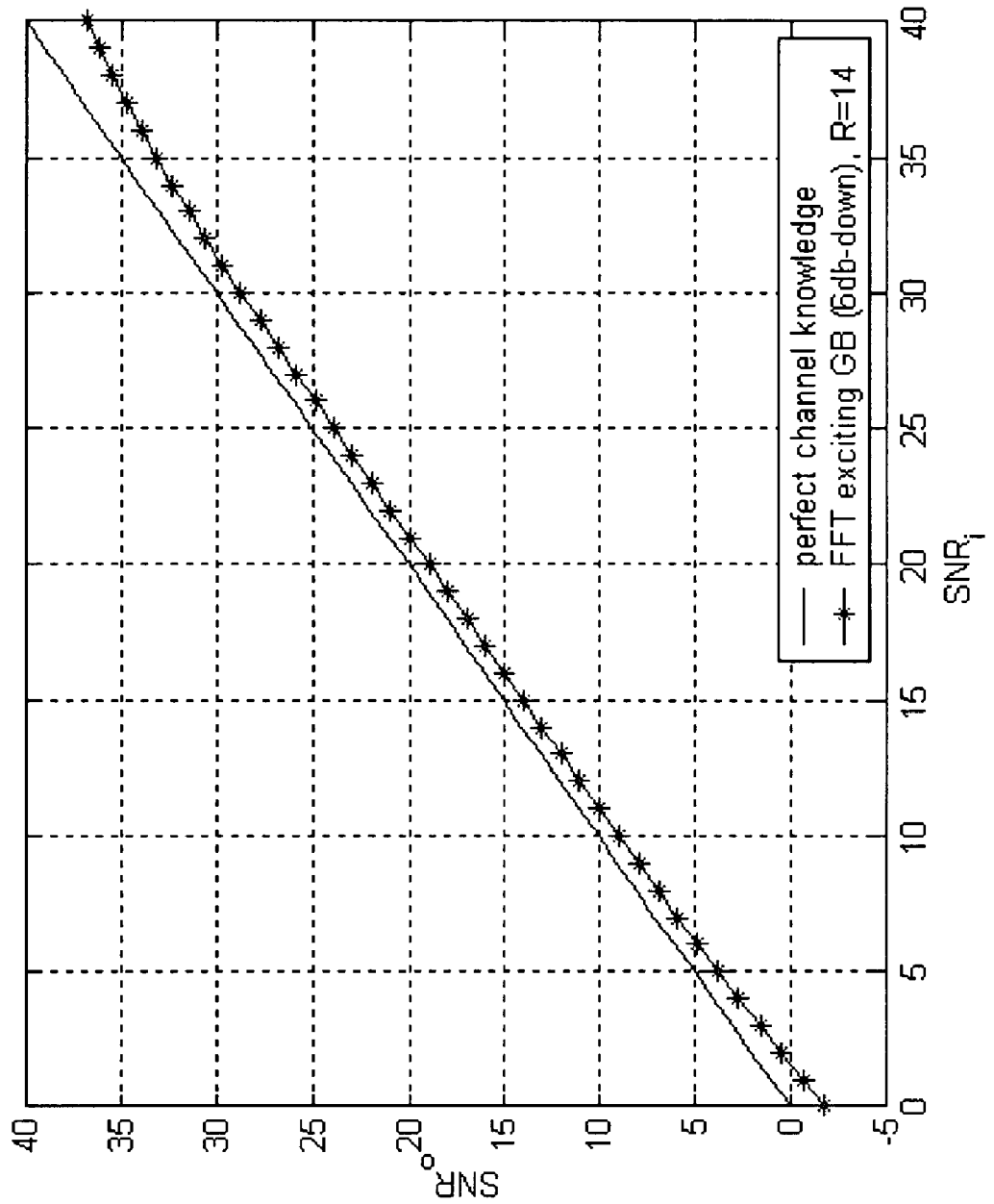
FIG. 5 is a graph of a representative performance of channel estimation carried out according to the principles of the present invention.

Turning now to FIG. 5, illustrated is a graph of a representative performance of channel estimation carried out according to the principles of the present invention. More specifically, FIG. 5 illustrates the theoretical performance of channel estimation employing a modified long training sequence having energized tones in the guard band as given by equation 6. Additionally, FIG. 5 reflects estimating the DC tone as given by equation 8 and substantially setting to zero middle taps associated with the channel impulse response to reduce noise contribution as described in the above-referenced co-pending U.S. patent application.

The performance of estimating a channel response was measured using a floating-point Matrix Laboratory (MAT-LAB) simulation. The degradation from perfect channel knowledge was measured using the output signal to noise ratio (SNR) as a metric. The input SNR, without channel distortion is given in equation 9 as:

$$SNR_i = \frac{\sigma_s^2}{\sigma_n^2} \quad (9)$$

The output SNR is the resultant SNR at the output due to channel estimation error is given in equation 10 as:

$$SNR_o = \frac{\sigma_s^2}{\sigma_n^2 + \sigma_c^2(\sigma_s^2 + \sigma_n^2)} \quad (10)$$

where $\sigma_c$ is the variance of the channel error, normalized for the channel over 52 tones that data is sent. Assuming that the channel error is zero mean, the expression for $\sigma_c$ is given by equation 11:

$$\sigma_c^2 = \frac{1}{N}\frac{1}{52}\sum_{i=1}^{N}\sum_{k \in 52 tones}\frac{(H_i[k] - \hat{H}_i[k])^2}{(H_i[k])^2} \quad (11)$$

With perfect channel knowledge, the input SNR, $SNR_i$, equals the output SNR, $SNR_o$. In general, however, input $SNR_i$ is less than output $SNR_o$. Input $SNR_i$ versus output $SNR_o$ is plotted for a channel estimator to assess its performance. The results are shown averaged over many multi-path channels.

Figure 6:
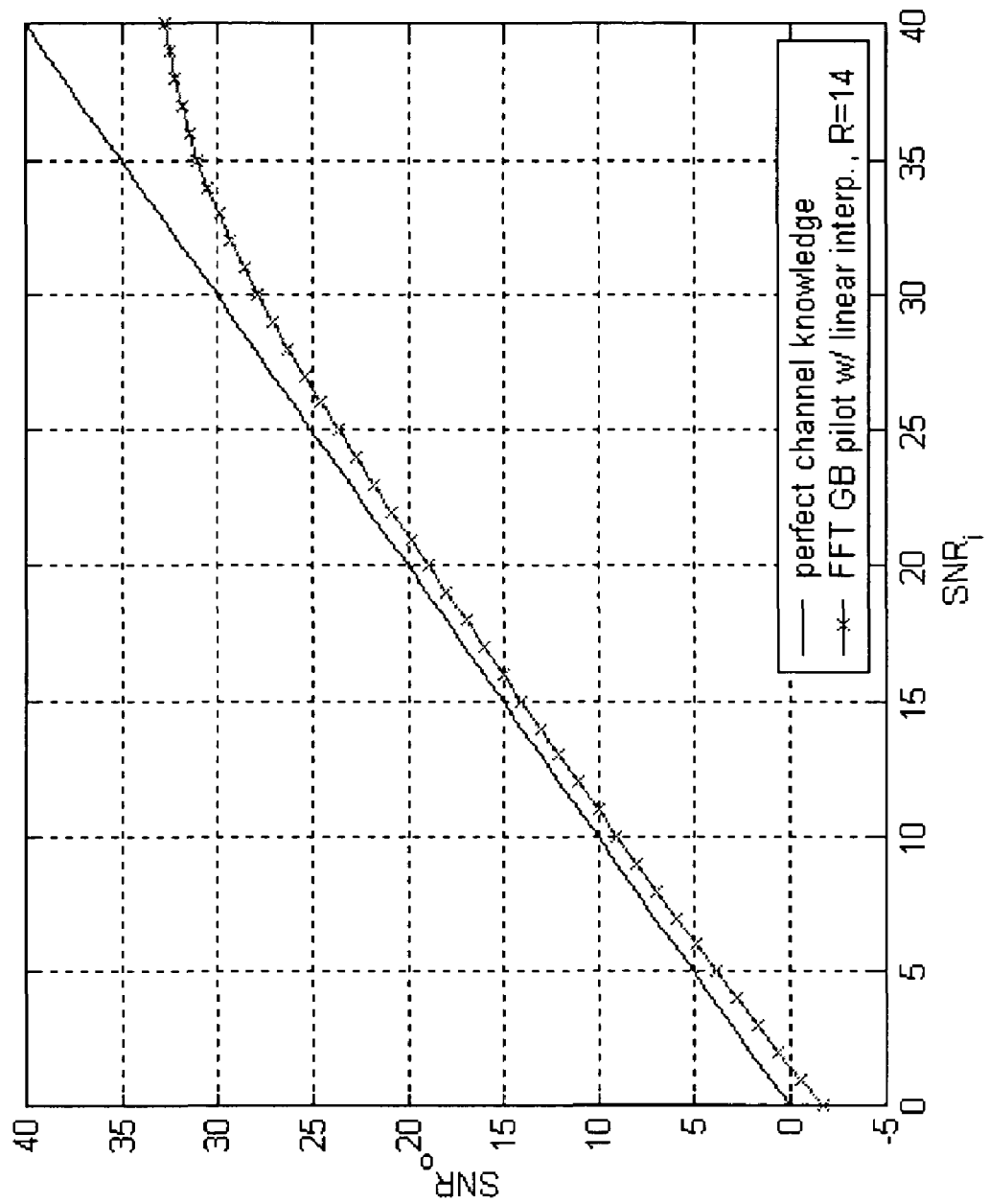
FIG. 6 is a graph of a representative performance of channel estimation carried out according to the principles of the present invention.

Turning now to FIG. 6, illustrated is a graph of a representative performance of channel estimation carried out according to the principles of the present invention. More specifically, FIG. 6 reflects interpolating the guard band tones as discussed above employing the modified long training sequence as given by equation 5.

Although the present invention has been described in detail, those skilled in the art should understand that they can make various changes, substitutions and alterations herein without departing from the spirit and scope of the invention in its broadest form.

What is claimed is:

1. An orthogonal frequency division multiplexing (OFDM) transmitter, comprising:
   a training sequence generator configured to generate a training sequence that includes a fractional tone in a guard band of the training sequence as transmitted from the transmitter; and
   OFDM transmission circuitry, coupled to said training sequence generator, configured to transmit said training sequence via a channel.

2. The transmitter as recited in claim 1 wherein said fractional tone is located in a center of said guard band.

3. The transmitter as recited in claim 1 wherein said fractional tone is attenuated at a decibel level selected from the group consisting of:
   at about twelve decibels from tones in a data band of said training sequence; and
   at about six decibels from tones in a data band of said training sequence.

4. The transmitter as recited in claim 1 wherein said fractional tone is positive in sign.

5. The transmitter as recited in claim 1 wherein said guard band is free of excited tones other than said fractional tone.

6. An orthogonal frequency division multiplexing (OFDM) receiver, comprising:
   OFDM reception circuitry configured to receive, via a channel, a training sequence that includes a fractional tone in a guard band thereof; and
   a channel estimator, coupled to said OFDM reception circuitry, configured to employ said fractional tone to obtain a channel response estimate based on an interpolation that assumes that the fractional tone was in the traininci sequence when transmitted.

7. The receiver as recited in claim 6 wherein said fractional tone is located in a center of said guard band and said channel estimator interpolates remaining tones of said guard band.

8. The receiver as recited in claim 6 wherein said fractional tone is attenuated at a decibel level selected from the group consisting of:
   at about twelve decibels from tones in a data band of said training sequence; and at about six decibels from tones in a data band of said training sequence.

9. The receiver as recited in claim 6 wherein said guard band is free of excited tones other than said fractional tone and said channel estimator linearly interpolates remaining tones of said guard band.

10. The receiver as recited in claim 6 wherein said channel estimator is further configured to interpolate a DC tone based on adjacent tones of said training sequence.

11. A method of obtaining a channel response estimate for use with an orthogonal frequency division multiplexing (OFDM) communications system, comprising:
   generating a fractional tone in a guard band of a training sequence;
   transmitting said training sequence via a channel; and
   employing said fractional tone to obtain a channel response estimate based on an interpolation that assumes that the fractional tone was in the training sequence when transmitted.

12. The method recited in claim 11 wherein said fractional tone is generated in a center of said guard band and said employing includes interpolating remaining tones of said guard band.

13. The method recited in claim 11 further comprising attenuating said fractional tone at a decibel level selected from the group consisting of:
   at about twelve decibels from tones in a data band of said training sequence; and
   at about six decibels from tones in a data band of said training sequence.

14. The method recited in claim 11 wherein said generating includes generating a fractional tone in a plurality of guard bands of said training sequence.

15. The method recited in claim 11 further comprising interpolating a DC tone based on adjacent tones of said training sequence.

16. An orthogonal frequency division multiplexing (OFDM) communications system, comprising:
   an OFDM transmitter that generates a training sequence that includes a fractional tone in a guard band of the traininci sequence as transmitted from the transmitter and transmits said training sequence via a channel; and
   an OFDM receiver that receives said training sequence and employs said fractional tone to obtain a channel response estimate based on an interpolation that assumes that the fractional tone was in the training sequence when transmitted.

17. The communications system as recited in claim 16 wherein said fractional tone is located in a center of said guard band and said OFDM receiver interpolates remaining tones of said guard band.

18. The communications system as recited in claim 16 wherein said fractional tone is attenuated at a decibel level selected from the group consisting of:
   at about twelve decibels from tones in a data band of said training sequence; and
   at about six decibels from tones in a data band of said training sequence.

19. The communications system as recited in claim 16 wherein said fractional tone is positive in sign.

20. The communications system as recited in claim 16 wherein said OFDM transmitter generates a fractional tone in a plurality of guard bands and said OFDM receiver employs at least one of said fractional tones to obtain said channel response estimate.

21. The communications system as recited in claim 16 wherein said OFDM receiver interpolates a DC tone based on adjacent tones of said training sequence.

* * * * *